United States Patent
Stelter et al.

(10) Patent No.: US 8,509,952 B2
(45) Date of Patent: Aug. 13, 2013

(54) METHOD FOR POSITION-DEPENDENT ELECTRONIC WEAR STATE DETERMINATION OF A VALVE MECHANISM, AND A PNEUMATIC VALVE

(75) Inventors: Andreas Stelter, Minden (DE); Urs E. Meier, Wuerenlingen (CH); Detlef Pape, Nussbaumen (CH)

(73) Assignee: ABB Technology AG, Zürich (CH)

( * ) Notice: Subject to any disclaimer, the term of this patent is extended or adjusted under 35 U.S.C. 154(b) by 318 days.

(21) Appl. No.: 12/644,992

(22) Filed: Dec. 22, 2009

(65) Prior Publication Data

US 2010/0179697 A1  Jul. 15, 2010

(30) Foreign Application Priority Data

Dec. 22, 2008 (DE) .................. 10 2008 064 359

(51) Int. Cl.
*G05D 7/00*     (2006.01)
(52) U.S. Cl.
USPC ........................... 700/282; 700/302; 700/304
(58) Field of Classification Search
USPC .................. 700/275, 281, 282, 301, 302, 304
See application file for complete search history.

(56) References Cited

U.S. PATENT DOCUMENTS

| | | | | |
|---|---|---|---|---|
| 3,922,111 A | * | 11/1975 | Deters | 417/26 |
| 4,274,438 A | | 6/1981 | LaCoste | |
| 4,976,144 A | * | 12/1990 | Fitzgerald | 73/168 |
| 5,424,941 A | * | 6/1995 | Bolt et al. | 700/28 |

FOREIGN PATENT DOCUMENTS

| | | |
|---|---|---|
| DE | 42 18 320 A1 | 12/1993 |
| DE | 102 09 545 A1 | 10/2003 |
| DE | 102 22 890 A1 | 12/2003 |
| EP | 0 739 503 B1 | 10/1996 |
| EP | 1 812 718 B1 | 8/2007 |
| WO | 2005/109140 A1 | 11/2005 |

OTHER PUBLICATIONS

German Search Report for DE 10 2008 064 359.9 dated Aug. 10, 2009.
Non-English German Office Action dated Jun. 26, 2009 issued in DE 10 2008 062 292.3-14.
Non-English German Office Action dated Jun. 26, 2009 issued in DE 10 2008 062 289.3-14.

* cited by examiner

*Primary Examiner* — Carlos Ortiz Rodriguez
(74) *Attorney, Agent, or Firm* — Buchanan Ingersoll & Rooney PC

(57) ABSTRACT

A method and a valve arrangement are provided for electronic wear state determination of the valve arrangement for controlling a process medium flow. A valve element, which is arranged so as to move axially within a valve housing, is moved via electrically drivable linear drive means on the basis of positioning regulation. The valve element has an essentially constant drive force applied to it, and a position speed profile over the switching travel of the valve element is determined by detecting the speed as a function of the current position of the valve element. A change profile is created by comparing the determined speed profile with previous position speed profiles, as a measure of the position-dependent wear state of the valve mechanism.

15 Claims, 2 Drawing Sheets

METHOD FOR POSITION-DEPENDENT ELECTRONIC WEAR STATE DETERMINATION OF A VALVE MECHANISM, AND A PNEUMATIC VALVE

RELATED APPLICATION

This application claims priority under 35 U.S.C. §119 to German Patent Application No. 10 2008 064 359.9 filed in Germany on Dec. 22, 2008, the entire content of which is hereby incorporated by reference in its entirety.

FIELD

The present disclosure relates to a method for electronic wear state determination of the valve mechanism of a valve arrangement. The present disclosure also relates to a valve arrangement which has means for implementation of such a method.

BACKGROUND INFORMATION

The term "position regulation" as used herein encompasses a mechatronic system which controls the auxiliary energy of a pneumatic actuating drive corresponding to one or more input signals, in order to move a valve element to a specific position. For operation, the position regulation may be supplied with pressurized gas, such as compressed air, as auxiliary energy, as well as electrical energy.

A known pneumatic position regulator includes several components referred to in more detail below. The drive chambers of a single-acting or double-acting pneumatic actuating drive are deliberately ventilated or vented as a function of one or more input signals, by means of a pneumatic system. The pneumatic system includes an auxiliary energy supply line, one or more pilot valve arrangements, and control pressure supply lines to the drive chambers in order to control the ventilation and/or venting of the drive chambers. The movements and positions of the valve element are represented as one or more signals, with the aid of a position sensor as a position feedback sensor system. Furthermore, control electronics are provided. The control electronics have a microcontroller and receive one or more input signals. The firmware in the control electronics processes the input signals and the signals in the position sensor to form output signals, which are used as input signals for the pneumatic system.

Actuating drives of the type of interest here are subdivided into pivoting drives and linear-movement drives. In the case of a linear-movement drive, the linear movement of the output drive of the actuating drive is transmitted directly to a linearly operated actuating member. On the other hand, in the case of the pivoting drive, the linear movement of the output drive of the actuating drive is converted to a rotary movement, by suitable conversion means.

The pneumatic actuating drive and the position regulation are connected by means of a fitting kit. The fitting kit comprises components which transmit the movement and position of the actuating drive with respect to the position feedback sensor system to the position regulation.

One issue when using valve arrangements such as this for installation control purposes is that, in the event of an unpredicted failure of a pneumatic actuating drive, the entire installation may also fail, which leads to production down times. Multiway valves for switching of compressed-air flows are particularly susceptible to failure in a pneumatic secondary drive since they are normally subject to a particularly severe mechanical alternating load during operation.

In order to cope with this problem, it has been normal practice until now to carry out preventative replacement after an estimated valve life has elapsed. With this technique, the replacement was often carried out well before the actual wear limit, since there is often a wide variation range between the estimated life and the actual life.

In addition to this failure problem, it is also possible for progressive wear in an installation to result in the switching of the actuating drive taking place continuously more slowly, which can result in disadvantageous overlapping phenomena, which can in turn lead to impermissible system states in the installation.

DE 102 22 890 A1 discloses a technical solution which is appropriate for the problem as described above and proposes specific electronic monitoring means for wear state monitoring of a pneumatic valve. An electronics unit is provided for this purpose which, on the input side, receives the electrical drive signal which is predetermined by a central control unit for the pneumatic valve, and an electrical reaction signal which follows a drive pulse initiated thereby. The electronics unit compares the time interval between the drive signal and the reaction signal of the switching delay as a measure of the wear state of the valve mechanism. The reaction signal is in this case determined by means of a pressure sensor which is integrated on the operating line side in the valve housing. This solution is based on the knowledge that lengthening of the switching time of a valve is directly related to the wear state over its entire operating time. This known solution therefore makes use of timely identification of undesirably long switching times to allow deliberate replacement of pneumatic valves or their parts that are subject to wear and which would fail in the foreseeable future. This ensures preventative maintenance of pneumatic installations.

However, this technical solution appears to have the disadvantage of the pressure sensor system which is provided for the purpose of determining the reaction signal to an electrical drive pulse. This is because correct operation of a pressure sensor cannot be ensured in all circumstances over the entire life of the valve. Furthermore, pressure sensors result in consumption of additional electrical energy, and are not required during normal operation of the valve.

In addition, the solution described above is also disadvantageous because the friction which indicates the wear state of the valve mechanism does not remain constant over the entire switching travel. The friction may vary considerably over the switching travel, particularly in the case of a slide-type valve, for example. Variations such as these cannot be detected with sufficiently high resolution by a pressure sensor system. Particularly if the valve element has to move over a relatively long switching travel, the friction as an indication of the wear state changes at a large number of switching positions. The friction along the switching travel is highly dependent on the internal diameter of the bore which guides the valve element, and on the component tolerances. This phenomenon is likewise included in the position-dependent wear state. Friction measurements or determinations which consider only the friction at a small number of position points along the switching travel will accordingly not reflect the correct wear state.

SUMMARY

An exemplary embodiment provides a method for electronic wear state determination of a valve arrangement for controlling a process medium flow. The valve arrangement includes a valve element which is arranged to move axially within a valve housing. The exemplary method comprises applying an approximately constant force to the valve element, and determining a position speed profile over the switching travel of the valve element by detecting a speed of the valve element as a function of a current position of the valve element. The exemplary method also comprises creating a change profile by comparing the determined position speed profile with previous position speed profiles, as a measure of the position-dependent wear state of the valve mechanism. In addition, the exemplary method comprises regulating a position of the valve element according to the position-dependent wear state of the valve mechanism, and linearly driving the valve element according to the regulated position.

Another exemplary embodiment provides a valve arrangement comprising a valve housing, a valve element configured to move axially within the valve housing, and a position regulating means for determining a position speed profile over a switching travel of the valve element. In addition, the exemplary valve arrangement comprises electrically drivable linear drive means for moving the valve element within valve housing on the basis of positioning regulation, and electronic means for wear state determination of a valve mechanism of the valve arrangement. The linear drive means apply an essentially constant drive force to the valve element. The position regulating means determines a position speed profile over the switching travel via a position sensor to detect the speed of the valve element as a function of a current position of the valve element. The electronic means for wear state determination comprise an evaluation unit configured to create a change profile by comparing the determined position speed profile with previous position speed profiles, as a measure of the position-dependent wear state of the valve mechanism.

BRIEF DESCRIPTION OF THE DRAWINGS

Additional refinements, advantages and features of the present disclosure are described in more detail below with reference to exemplary embodiments illustrated in the drawing, in which.

DETAILED DESCRIPTION

Figure 1:
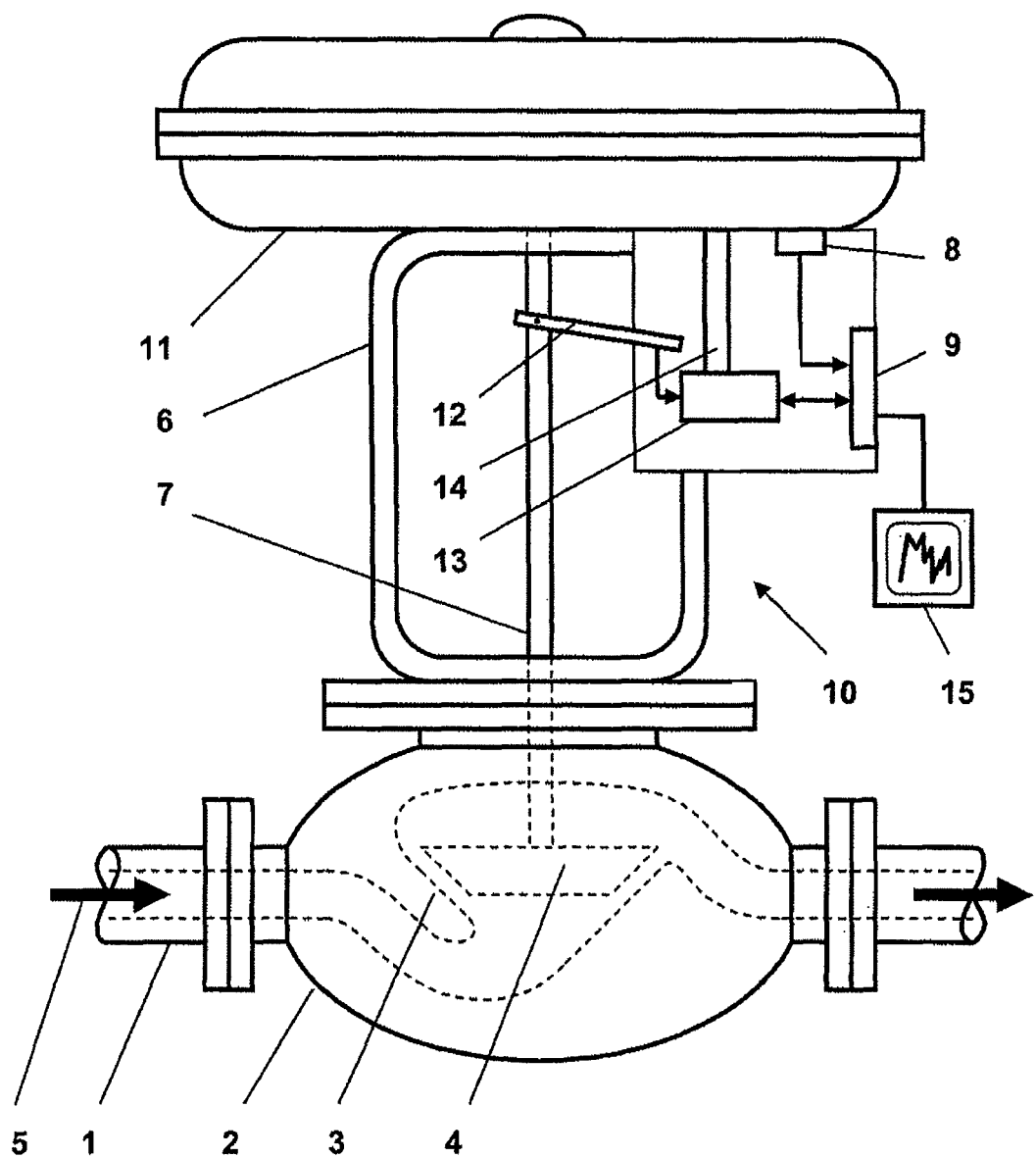
FIG. 1 shows a schematic illustration of an exemplary pneumatic actuating drive with integrated electronic means for wear state determination of a valve mechanism.

Exemplary embodiments of the present disclosure provide a method for electronic wear state determination of the valve mechanism of a pneumatic actuating drive, which ensures reliable position-dependent wear state determination with the aid of simple electronic components. Exemplary embodiments of the present disclosure also provide a pneumatic valve which can implement such a method.

According to an exemplary embodiment, the valve element of a pneumatic actuating valve has an essentially constant drive force applied to it, and the speed profile over the switching travel of the valve element is determined by detecting the speed as a function of the current position of the valve element, from which a change profile is created by comparison with previous position speed profiles, as a measure of the position-dependent wear state of the valve mechanism.

Exemplary embodiments of the present disclosure advantageously provide a technique which obviates the need for a pressure sensor system within the valve for electronic wear state determination. The method according to the disclosure requires only a position sensor system, which is provided in any case for position regulation, thus allowing an overview of the friction profile, and therefore of the wear state of the valve mechanism at every point in the switching travel. The friction is speed-dependent and, when a constant drive force is applied to the valve element, the sliding friction will vary over the switching travel, as a result of which the friction force has a similar behavior to that of the drive force. For a predetermined drive force, the speed can therefore be used as an indicator of the friction force, which is in turn used as an indication of the wear state. High friction values in this case indicate increased wear which, in the case of pneumatic valves with dynamically sealing elastomer rings, can be caused, for example, by the aging process of the sealing rings and crack formation as well as swelling associated therewith. The speed will be high at positions where the friction is low and the switching element will continue to move at a lower speed when the friction is high. This results in a position speed profile which has a number of maxima and minima along the switching travel of a valve slide.

According to an exemplary embodiment, the currently determined position speed profile can be indicated on a display unit directly adjacent to the valve. This display unit can be arranged in the area of the valve housing, for a desired local graphic display. This provides the user with a simple overview of the extent and variability of the friction, in order to assess the wear state. This allows friction points to be specifically located, in order to eliminate them by replacement of individual sealing rings, for example.

If the actuating drive is a pneumatic actuating drive with pilot control, an exemplary embodiment provides that the constant drive force can be produced by a constant control pressure, which can be provided by a pilot valve that is in the form of an I/P converter, for example. Since the effective area of the control piston of a valve element is constant, the constant drive force can be achieved by this simple measure within the scope of pneumatic pilot control.

In order to improve the abovementioned measure further in the case of a pneumatic actuating drive which can be in the form of a spring-reset valve, for example, an exemplary embodiment provides that the control pressure in compensated in signal processing by the influence of the spring force profile.

A position speed profile which is currently determined by the solution according to the disclosure over the switching travel can, according to another measure as an improvement to the disclosure, be stored in an electronic memory unit, to be precisely measured together with previously determined position speed profiles, in order to make it possible to create a change profile, as a measure of the position-dependent wear state of the valve mechanism, by comparison, via a memory access from an electronic evaluation unit.

FIG. 1 illustrates an exemplary embodiment of a pneumatic actuating drive with integrated electronic means for wear state determination of the valve mechanism. In the exemplary embodiment illustrated in FIG. 1, a valve element, which is arranged such that it can move axially within a valve housing, is moved via electrically drivable linear drive means on the basis of position regulation. As shown in FIG. 1, a valve housing 2 of a process valve is installed in a pipeline 1 of a process installation. In its interior, the valve housing 2 has a valve element 4 which interacts with a valve seat 3 in order to control the amount of process medium 5 passing through. The valve element 4 is operated linearly via a pushrod 7 by a pneumatic actuating drive 10. The pneumatic actuating drive 10 is connected via a yoke 6 to the valve housing 2 of the process valve. A digital position regulator with positioning regulation 13 is fitted to the yoke 6. The travel of the pushrod 7 into the area of the position regulator 13 is signaled via a position sensor 12. The detected travel is compared within the positioning regulation 13 with a predetermined nominal value, and the pneumatic actuating drive 10 is operated as a function of the determined regulation discrepancy with respect to the predetermined nominal value, for example. The pneumatic actuating drive 10 comprises a pilot valve arrangement—for example an electropneumatic I/P converter—for conversion of the electrical regulation signal for the determined regulation discrepancy to an adequate control pressure. The control pressure is passed via a pressure medium supply 14 in a drive chamber 11 of the pneumatic actuating drive 10.

The position sensor 12 can be used in a dual function as electronic means for wear state identification of the valve mechanism. Via the position sensor 12, the positioning regulation 13 can determine the position speed profile of the pushrod 7 as a component of the valve element 4 over its switching travel. The relationship between the speed and the current position of the valve element can be determined within the positioning regulation 13, from which a downstream evaluation unit 9 creates a change profile, as a measure of the position-dependent wear state of the valve mechanism, by comparison with previous position speed profiles. A further component of the evaluation unit 9 is a display unit 15 which is attached, together with the evaluation unit 9, to the pneumatic actuating drive 10. The display unit 15 can display measured position speed profiles in order to provide a directly local graphic display adjacent to the valve arrangement.

The sensor system 8, evaluation unit 9, position sensor 12, and positioning regulation 13 were each described above with reference to the respective functions they perform according to an exemplary embodiment. It is to be understood that one or more these elements can be implemented in a hardware configuration. For example, the respective components can comprise a computer processor configured to execute computer-readable instructions (e.g., computer-readable software), a non-volatile computer-readable recording medium configured to store such computer-readable instructions, and a volatile computer-readable recording medium configured to be utilized by the computer processor as working memory while executing the computer-readable instructions. The sensor system 8, evaluation unit 9, position sensor 12, and positioning regulation 13 may also be configured to sense, generate and/or operate in accordance with analog signals, digital signals and/or a combination of digital and analog signals to carry out their intended functions.

Figure 2:
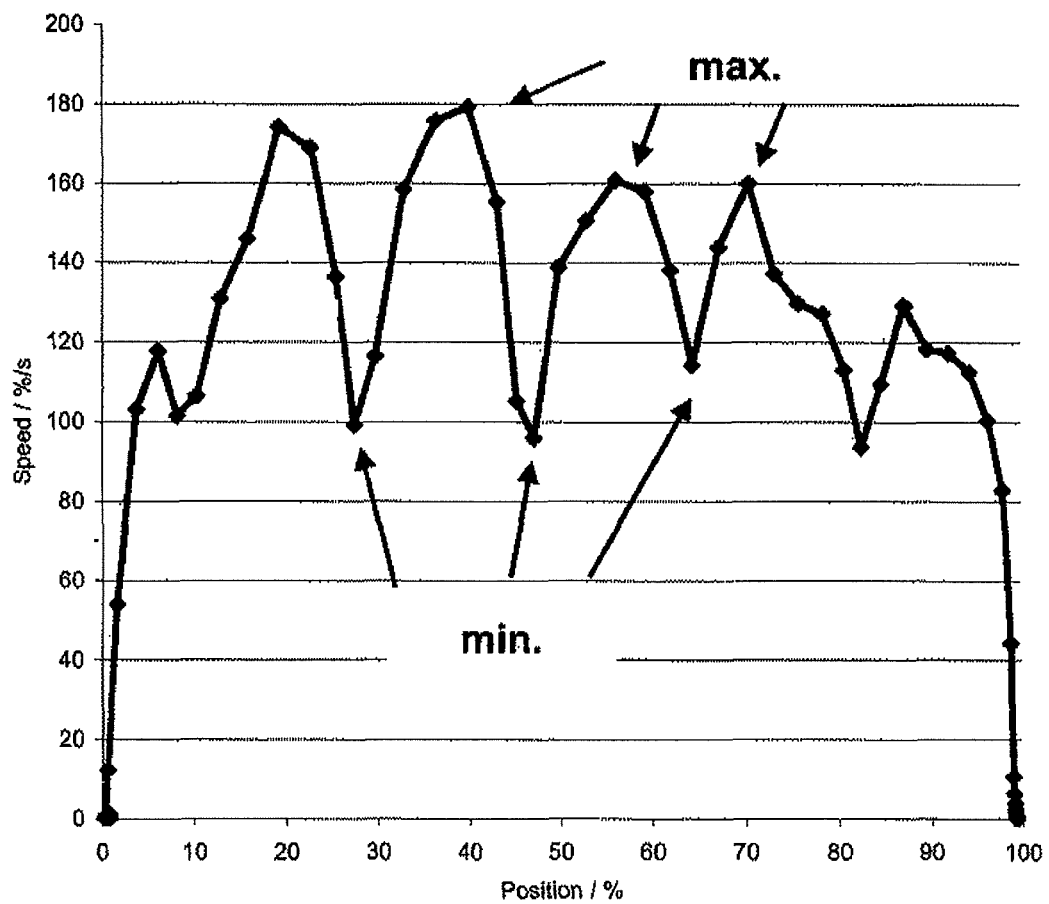
FIG. 2 shows an illustration, in the form of a graph, of an exemplary position speedprofile over a switching travel of a valve element.

FIG. 2 shows an exemplary position speed profile in the form of a graph. FIG. 2 shows the speed of the switching element over its switching travel, with the variations in the speed directly reflecting the variations in the friction. The switching travel is plotted in the form of the position as a percentage on the horizontal axis, with 100% representing the switching travel having been carried out completely. The speed is plotted as a percentage per second on the vertical axis. The graph shows the position speed profile over the switching travel, illustrating the maxima positions of low friction and the minima positions of high friction. The graph makes it possible for the user to visually locate the positions of high friction in order to take appropriate maintenance measures or to examine the wear state of the valve mechanism as a function of position, in a general form.

The position of the valve element can be described by the following equation:

$$\Delta pA - k(x+x_0) = f_D + \epsilon \dot{x} + \epsilon_2 \dot{x}^2 + (f_s - f_D) e^{-(\dot{x}/\dot{x}_0)^n} + m\ddot{x}$$

The term on the left-hand side describes the drive force for the switching element. This comprises the force of the pressure difference $\Delta p$ of the pilot control and a spring force ($k(x+x0)$) for a pilot-controlled monostable pneumatic valve. This drive force can be determined by pressure regulation of the pilot control and additionally, for a monostable valve, by a spring force measurement, as a result of which the drive force is known.

The right-hand side of the equation comprises an acceleration term (md2x/dt2) and the friction force. When the speed is constant, this acceleration term tends to 0, and the drive force is equivalent to the friction. In this case, the acceleration component of the movement is normally very small in comparison to the friction force, particularly when the friction rises as the pneumatic valve ages. The movement of the switching element is therefore governed mainly by the friction.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Valve housing
3 Valve seat
4 Valve element
5 Process medium
6 Yoke
7 Pushrod
8 Sensor system
9 Evaluation unit
10 Pneumatic actuating drive
11 Drive chamber
12 Position sensor
13 Positioning regulation
14 Pressure medium supply
15 Display unit

What is claimed is:

1. A method for electronic wear state determination of a valve arrangement for controlling a process medium flow, wherein the valve arrangement includes a valve element which is arranged to move axially within a valve housing to control an amount of a process medium passing through the valve housing, the method comprising:
   applying a constant force to the valve element;
   determining a position speed profile over a switching travel of the valve element based on the constant force applied to the valve element, by detecting a speed of the valve element as a function of a current position of the valve element;
   creating a change profile by comparing the determined position speed profile with previous position speed profiles, as a measure of a position-dependent wear state of the valve element; and
   regulating a position of the valve element according to the position-dependent wear state of the valve element, and linearly driving the valve element according to the regulated position.

2. The method as claimed in claim 1, comprising indicating the determined position speed profile on a display unit directly adjacent to the valve arrangement.

3. The method as claimed in claim 2, wherein the valve arrangement comprises a pneumatic actuating drive, and the display unit is arranged adjacent to the pneumatic actuating drive.

4. The method as claimed in claim 1, wherein the constant force is applied to the valve element to provide pneumatic pilot control.

5. The method as claimed in claim 4, wherein the valve element is a spring-reset valve element, and
wherein the method comprises compensating the constant force in signal processing by an influence of a spring force profile of a resetting spring of the spring-reset valve element.

6. The method as claimed in claim 1, comprising storing the determined position speed profiles over the switching travel in association with previous position speed profiles.

7. A valve arrangement comprising:
a valve housing;
a valve element configured to move axially within the valve housing to control an amount of a process medium passing through the valve housing;
position regulating means for determining a position speed profile over a switching travel of the valve element;
electrically drivable linear drive means for moving the valve element within the valve housing on the basis of positioning regulation; and
electronic means for wear state determination of a valve mechanism of the valve arrangement, wherein:
the linear drive means apply a constant drive force to the valve element;
the position regulating means determines a position speed profile over the switching travel via a position sensor based on the constant force applied to the valve element, to detect the speed of the valve element as a function of a current position of the valve element; and
the electronic means for wear state determination comprise an evaluation unit configured to create a change profile by comparing the determined position speed profile with previous position speed profiles, as a measure of a position-dependent wear state of the valve mechanism.

8. The valve arrangement as claimed in claim 7, comprising a display unit adjacent to the valve arrangement and configured to display the determined position speed profile in order to provide a local graphic display.

9. The valve arrangement as claimed in claim 7, comprising a memory unit integrated in the evaluation unit and configured to store the determined position speed profile over the switching travel in association with previous position speed profiles.

10. The valve arrangement as claimed in claim 7, wherein the electrically drivable linear drive means comprise a pilot valve for application of a control pressure to the valve element in the form of a pneumatic pilot control.

11. The pneumatic valve as claimed in claim 10, wherein the pilot valve comprises an I/P converter configured to produce the constant drive force.

12. The valve arrangement as claimed in claim 7, wherein the valve arrangement is a pneumatic actuating drive.

13. The valve arrangement as claimed in claim 12, comprising a display unit adjacent to the pneumatic actuating drive and configured to display the determined position speed profile in order to provide a local graphic display.

14. The valve arrangement as claimed in claim 7, wherein the electrically drivable linear drive means moves the valve element in accordance with the position-dependent wear state created by the evaluation unit.

15. The valve arrangement as claimed in claim 7, wherein the evaluation unit creates the change profile to regulate a position of the valve element according to the position-dependent wear state of the valve mechanism, and the electrically drivable linear means moves the valve element according to the regulated position.

\* \* \* \* \*